United States Patent
Moghe et al.

(10) Patent No.: US 11,001,158 B2
(45) Date of Patent: May 11, 2021

(54) AUTOMATED VEHICLE PARKING AND WIRELESS POWER TRANSFER (WPT) CHARGING

(71) Applicant: Cisco Technology, Inc., San Jose, CA (US)

(72) Inventors: Ashok Krishnaji Moghe, Pleasanton, CA (US); John George Apostolopoulos, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 312 days.

(21) Appl. No.: 15/862,117

(22) Filed: Jan. 4, 2018

(65) Prior Publication Data

US 2019/0202304 A1  Jul. 4, 2019

(51) Int. Cl.
| | |
|---|---|
| *B60L 9/00* | (2019.01) |
| *B60L 53/39* | (2019.01) |
| *B60L 53/12* | (2019.01) |
| *B60L 53/65* | (2019.01) |
| *B60L 53/66* | (2019.01) |
| *H02J 7/02* | (2016.01) |

(52) U.S. Cl.
CPC .............. *B60L 53/39* (2019.02); *B60L 53/12* (2019.02); *B60L 53/65* (2019.02); *B60L 53/665* (2019.02); *B60L 2230/16* (2013.01); *H02J 7/025* (2013.01)

(58) Field of Classification Search
None
See application file for complete search history.

(56) References Cited

U.S. PATENT DOCUMENTS

| 9,302,594 B2 | 4/2016 | Tripathi et al. |
| 9,383,749 B2 | 7/2016 | Prada Gomez et al. |
| | (Continued) | |

FOREIGN PATENT DOCUMENTS

CN  106530820 A  3/2017

OTHER PUBLICATIONS

Schaal, Eric., "Volkswagen Gives Everyone a Big Reason to Love Autonomous Cars", https://www.cheatsheet.com/automobiles/volkswagen-gives-everyone-a-big-reason-to-love-autonomous-cars.html/?a=viewall, 2 pages, Jul. 28, 2015, CheatSheet.com.

*Primary Examiner* — Peter D Nolan
*Assistant Examiner* — Ce Li Li
(74) *Attorney, Agent, or Firm* — Behmke Innovation Group LLC; James M. Behmke; Jonathon P. Western

(57) ABSTRACT

In one embodiment, a static wireless power transfer (WPT) system (with charging spots and non-charging parking spots) receives a request to charge a vehicle. The device schedules a period of time during which the vehicle is allocated access to a particular charging spot based on scheduling characteristics and one or more other vehicles also requesting charging. The device may then send instructions to control the vehicle to autonomously move from a current parking spot to the particular charging spot for the scheduled period of time, the instructions precisely aligning the vehicle in the particular charging spot for optimum power transfer based on a charging coil of the vehicle and a respective ground-based charging coil of the particular charging spot. After the scheduled period of time, the device may send additional instructions to control the vehicle to autonomously move out of the particular charging spot.

20 Claims, 12 Drawing Sheets

(56) References Cited

U.S. PATENT DOCUMENTS

| | | | |
|---|---|---|---|
| 9,718,370 B2 | 8/2017 | Penilla et al. | |
| 2014/0062402 A1* | 3/2014 | Farkas | B60L 53/14 |
| | | | 320/109 |
| 2015/0073642 A1 | 3/2015 | Widmer et al. | |
| 2015/0298569 A1* | 10/2015 | Kosetsu | B60L 53/64 |
| | | | 320/155 |
| 2016/0059723 A1* | 3/2016 | Kim | B60L 53/38 |
| | | | 320/108 |
| 2016/0375898 A1* | 12/2016 | Breuel | B60L 53/60 |
| | | | 340/932.2 |
| 2017/0129354 A1* | 5/2017 | Hadeli | B60L 53/31 |
| 2017/0315557 A1* | 11/2017 | Vogt | B60L 58/12 |
| 2017/0329346 A1* | 11/2017 | Latotzki | G05D 1/0088 |
| 2018/0065494 A1* | 3/2018 | Mastrandrea | B60L 53/60 |
| 2018/0105051 A1* | 4/2018 | Zheng | G06Q 30/0267 |
| 2018/0143035 A1* | 5/2018 | Ricci | G01S 7/4021 |
| 2018/0304759 A1* | 10/2018 | Chase | G06Q 30/04 |
| 2018/0304760 A1* | 10/2018 | Chase | G06Q 30/04 |
| 2018/0304761 A1* | 10/2018 | Chase | B60L 53/36 |
| 2018/0307226 A1* | 10/2018 | Chase | G05D 1/0027 |
| 2018/0373268 A1* | 12/2018 | Antunes Marques Esteves | |
| | | | B60L 53/00 |
| 2019/0039465 A1* | 2/2019 | Jang | B60L 53/12 |
| 2019/0070968 A1* | 3/2019 | Fukubayashi | B60L 53/12 |
| 2019/0184844 A1* | 6/2019 | Uyeki | H02J 7/007 |
| 2019/0205842 A1* | 7/2019 | Starns | G05D 1/0291 |
| 2020/0082352 A1* | 3/2020 | Liu | G06Q 10/1095 |

* cited by examiner

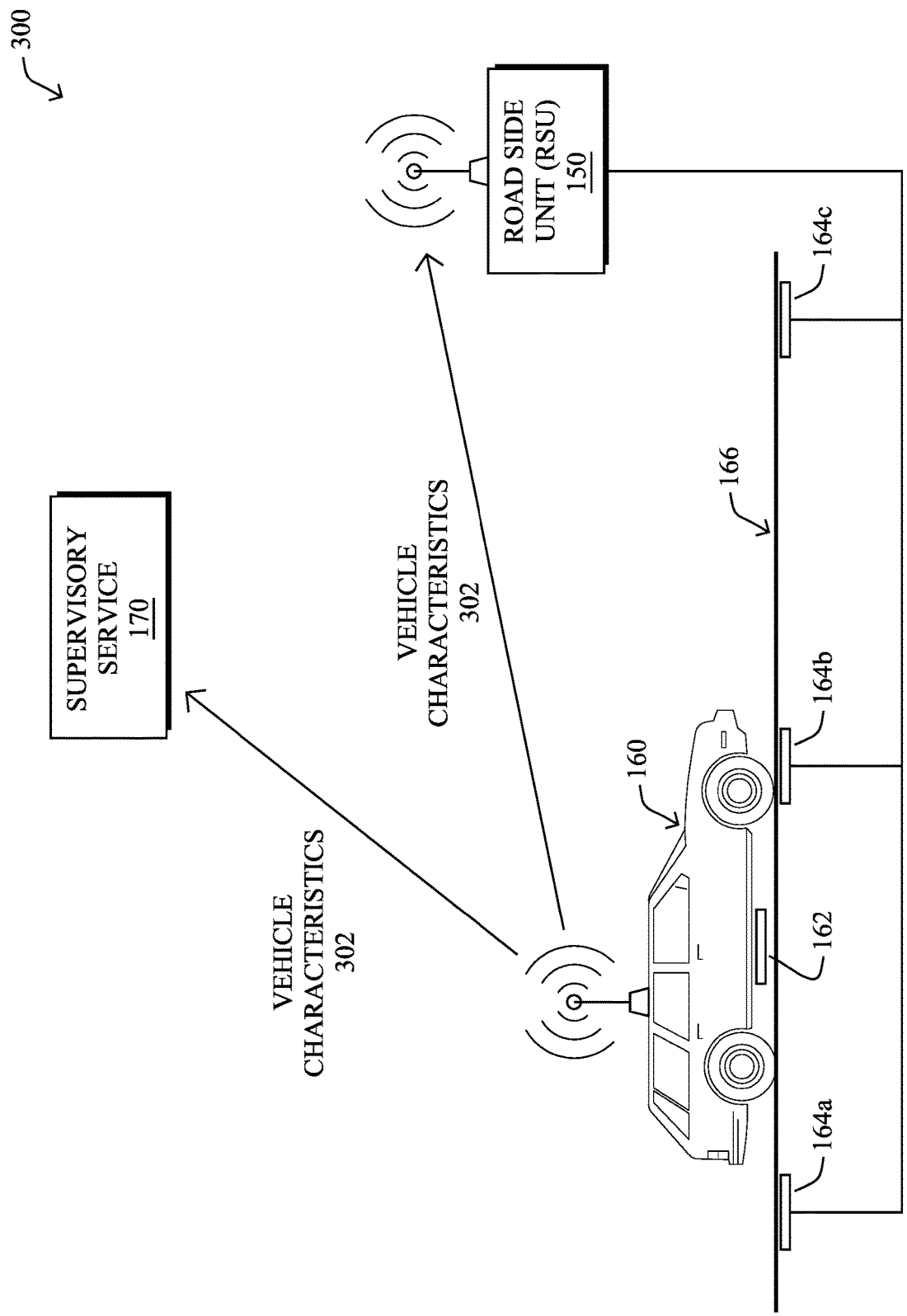

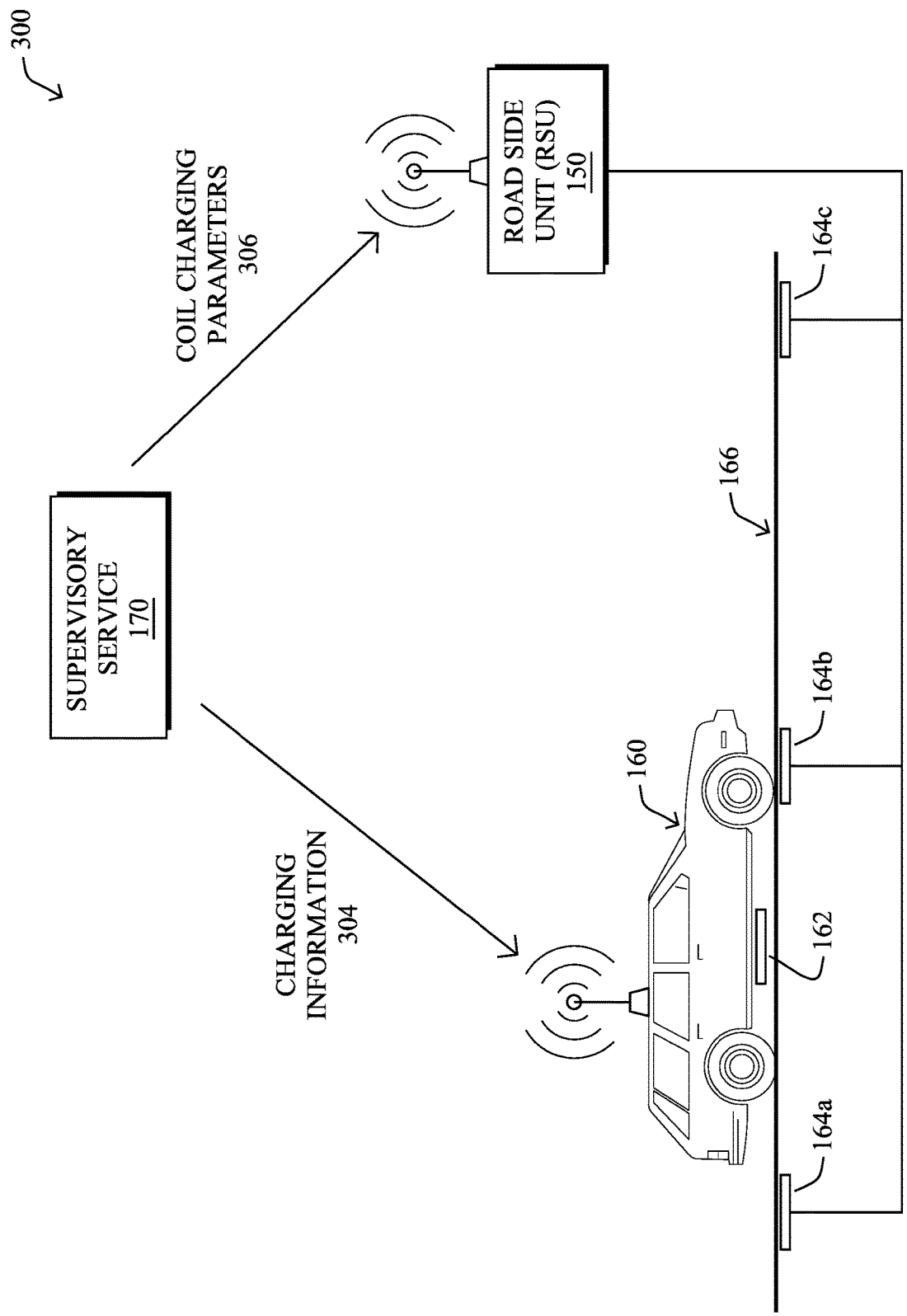

AUTOMATED VEHICLE PARKING AND WIRELESS POWER TRANSFER (WPT) CHARGING

TECHNICAL FIELD

The present disclosure relates generally to computer networks, and, more particularly, to automated vehicle parking and wireless power transfer (WPT) charging.

BACKGROUND

Wireless power transfer (WPT) is an emerging technology that has proven to be effective for charging vehicles, such as electric vehicles (EVs). In a typical WPT setup for EVs, a ground-based charging coil is supplied power, thereby inducing a current remotely in a second, vehicle-based coil located at the bottom of the EV.

Electric vehicles (EVs), such as cars, buses, trains, and the like, are becoming increasingly more prevalent. To aid in recharging EVs, many parking garages and lots are now equipped with charging stations. Currently, the charging procedure for EVs in parking garages and lots is cumbersome to the EV user and operators of the garages/lots.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 3A-3D illustrate an example of powering a ground-based charging coil for a vehicle;

DESCRIPTION OF EXAMPLE EMBODIMENTS

Overview

Figure 1A:
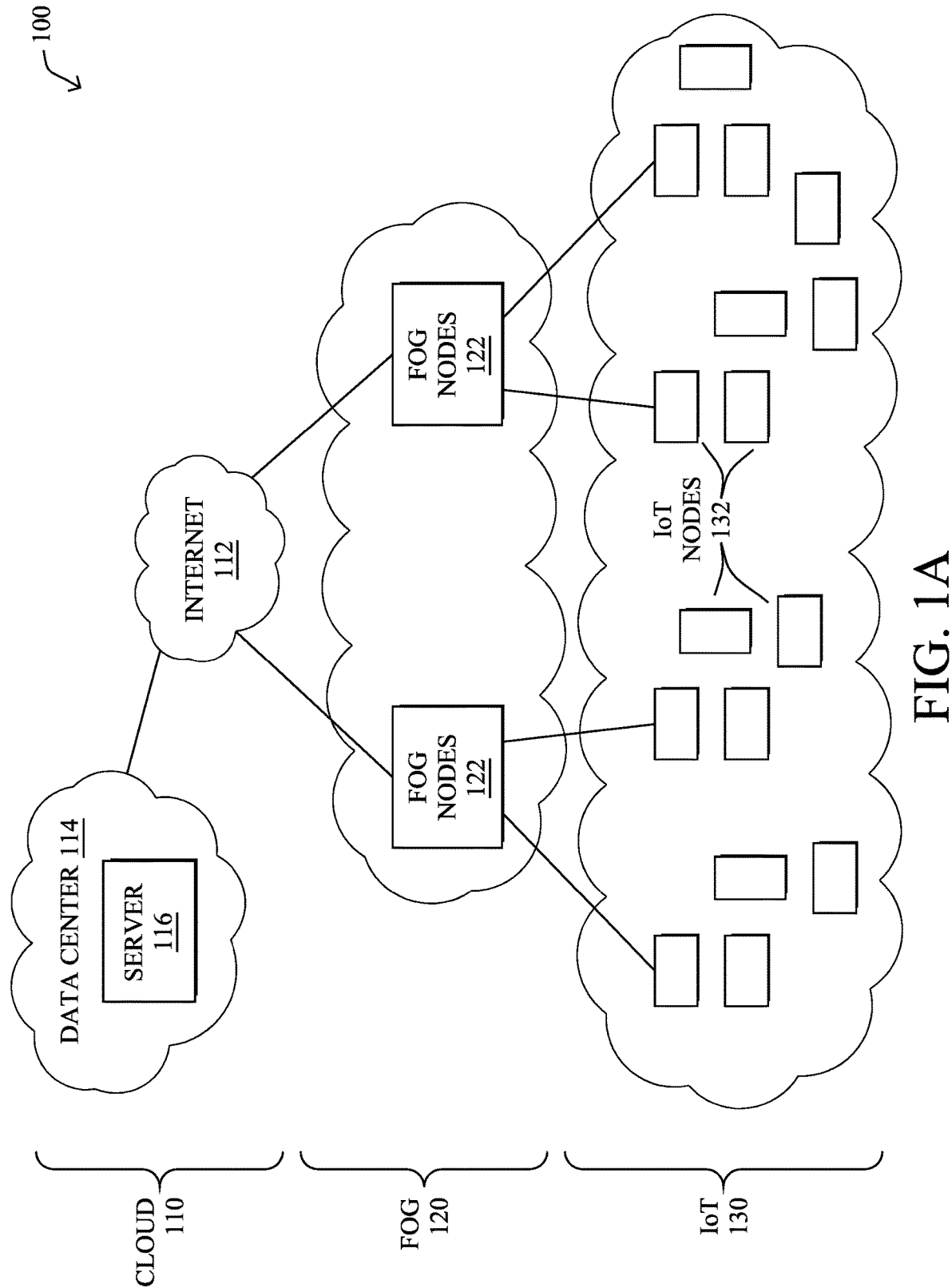
FIGS. 1A-1B illustrate an example communication network.

According to one or more embodiments of the disclosure, a device associated with a static wireless power transfer (WPT) system receives a request to charge a vehicle equipped with a vehicle-based charging coil configured to receive electrical power transferred from ground-based charging coils, where the static WPT system has one or more charging spots with a respective ground-based charging coil and one or more non-charging parking spots. The device may then schedule a period of time during which the vehicle is allocated access to a particular charging spot of the one or more charging spots based on one or more scheduling characteristics and one or more other vehicles requesting charging within the static WPT system. Based on determining a current parking spot of the one or more parking spots in which the vehicle is parked prior to the scheduled period of time, the device may send a first set of instructions to control the vehicle to autonomously move from the current parking spot to the particular charging spot for the scheduled period of time, the first set of instructions precisely aligning the vehicle in the particular charging spot for optimum power transfer based on the vehicle-based charging coil of the vehicle and the respective ground-based charging coil of the particular charging spot. Subsequently, the device may send a second set of instructions to control the vehicle to autonomously move out of the particular charging spot after the scheduled period of time.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh network, such as wireless or PLC networks, etc., and are often on what is referred to as Low-Power and Lossy Networks (LLNs), which are a class of networks in which both the routers and their interconnects are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1A is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 1B:
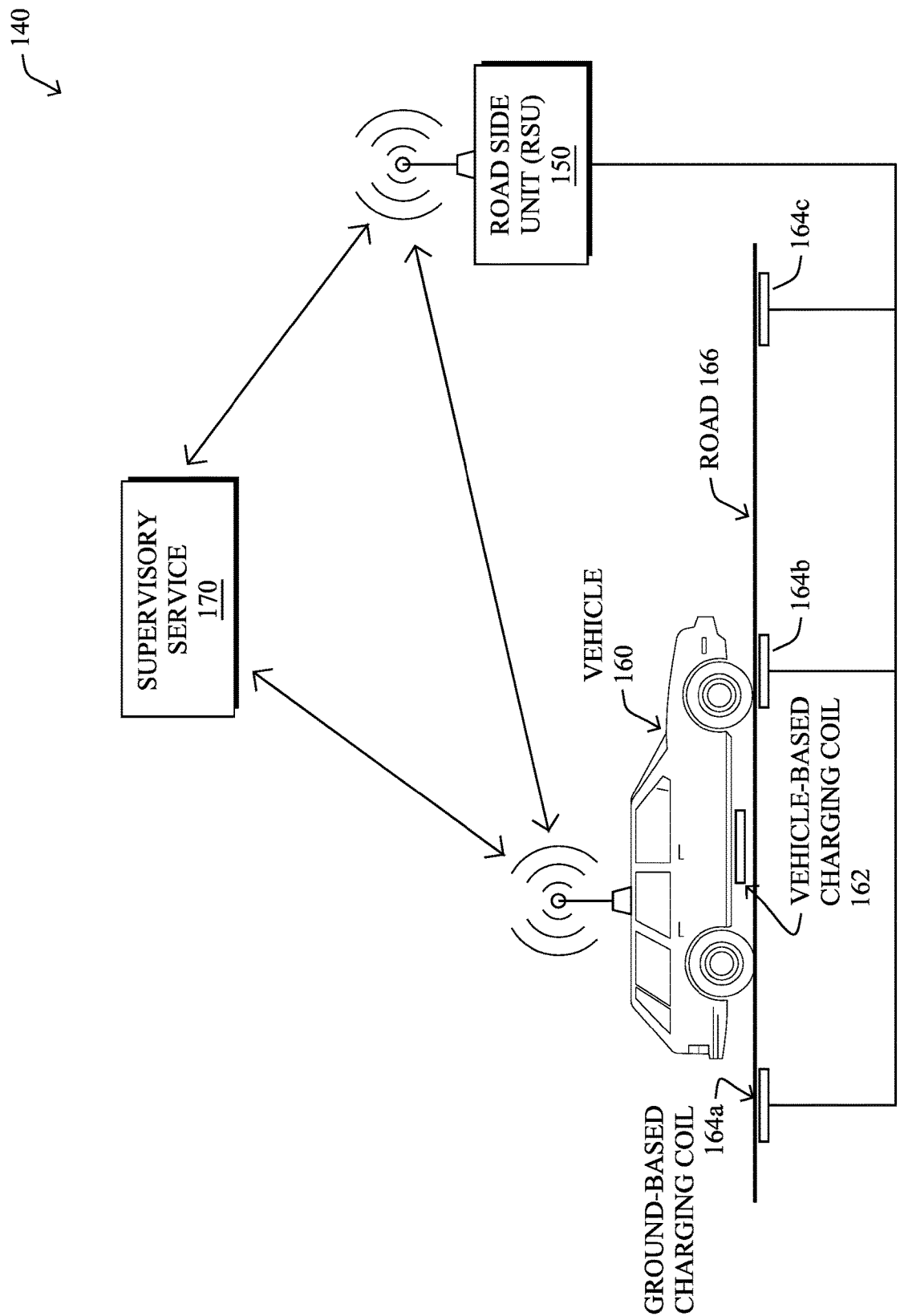

FIG. 1B illustrates an example wireless power transfer (WPT) system 140, which may be based on a moving environment (e.g., road), or else a parking lot environment, as described below. In particular, WPT system 140 may include any or all of the following components: a vehicle 160, a roadside unit (RSU) 150 (which, notably, may be found within a parking lot, parking structure, or any infrastructure element), one or more ground-based charging coils 164, and/or a remote supervisory service 170. During operation, WPT system 140 may be operable to provide electrical charge to a local battery of vehicle 160, which may itself be an electric vehicle (e.g., either a fully-electric or hybrid electric vehicle).

In some embodiments, WPT system 140 may be a specific implementation of communication network 100. Notably, supervisory service 170 may be implemented at the cloud layer 110, such as at a particular server 116 in a data center 114 or, alternatively, across multiple servers 116, such as part of a cloud-based service. Similarly, RSU 150 may be a fog node 122 at fog computing layer 120, while vehicle 160 may be viewed as an IoT node 132 at IoT layer 130. Thus, vehicle 160 may communicate directly with RSU 150, and/or via other IoT nodes 132 (e.g., other vehicles, etc.), and RSU 150 may provide some degree of processing over the communicated data.

RSU 150 may communicate with supervisory service 170 via a WAN, such as the Internet 112 or another WAN. For example, RSU 150 may communicate with supervisory service 170 by leveraging a hardwired network connection, cellular or other wireless connection, satellite connection, or the like. Communications between vehicle 160 and RSU 150 may generally be wireless and use any form of known wireless communication (e.g., Wi-Fi, cellular, light-based, etc.).

As would be appreciated, vehicle 160 may comprise its own local network, to allow the various components of vehicle 160 to communicate with one another. For example, vehicle 160 may comprise a controller area network (CAN) bus, IP network, or the like, to allow the various systems of vehicle 160 to communicate with one another. Such system may include, but are not limited to, an engine control unit (ECU), a battery management system (BMS) that manages the local battery of vehicle 160, and the like. A local gateway of vehicle 160 may provide communicative connectivity between the local network of vehicle 160 and other devices. For example, the local gateway of vehicle 160 may provide wireless connectivity to RCU 150 located along vehicle surface 166 on which vehicle 160 is parked or traveling (e.g., a parking lot and/or road). In some embodiments, vehicle 160 may also communicate directly with supervisory service 170 via the Internet 112 or another WAN, such as by leveraging a wireless connection to a cellular or satellite-based network.

In various embodiments, vehicle 160 may comprise one or more vehicle-based charging coils 162 that are electronically coupled to the battery of vehicle 160. In addition, as shown, any number of ground-based charging coils 164 may be located along vehicle surface 166, such as embedded into vehicle surface 166, located at the top of the vehicle surface 166 (e.g., visibly appearing at the surface of the road), or located on the top of the road (e.g., in parking spaces where speed and location allow). For example, ground-based charging coils 164a-164c may be embedded into vehicle surface 166 at different locations (e.g., different parking spots, described below) and wired to RSU 150 that provides control over the powering of ground-based charging coils 164. For purposes of clarification, the term "ground-based charging coil" generally refers to the location of the charging coil (e.g., embedded into the ground) and is not intended to imply that a coil 164 acts an electrical ground. Also note that a ground-based coil is also sometimes referred to as a "primary coil" or "grid side coil."

During operation, ground-based charging coils 164 may be powered/energized, to charge the battery of vehicle 160. Notably, when vehicle-based charging coil 162 is located within proximity of a given ground-based charging coil 164, the powered coil 164 may inductively couple with vehicle-based charging coil 162. As a result, a current will be induced in vehicle-based charging coil 164, which can be used to restore charge to the battery of vehicle 160. Such charging may be performed when vehicle 160 is stationary or in motion, depending on the implementation. In addition, as noted above, while ground-based charging coils 164 are shown as embedded into vehicle surface 166, other implementations provide for coils 164 to be embedded into, or placed on, a parking lot, drive-thru, driveway, or any other location at which vehicle 160 may be located.

Figure 2:
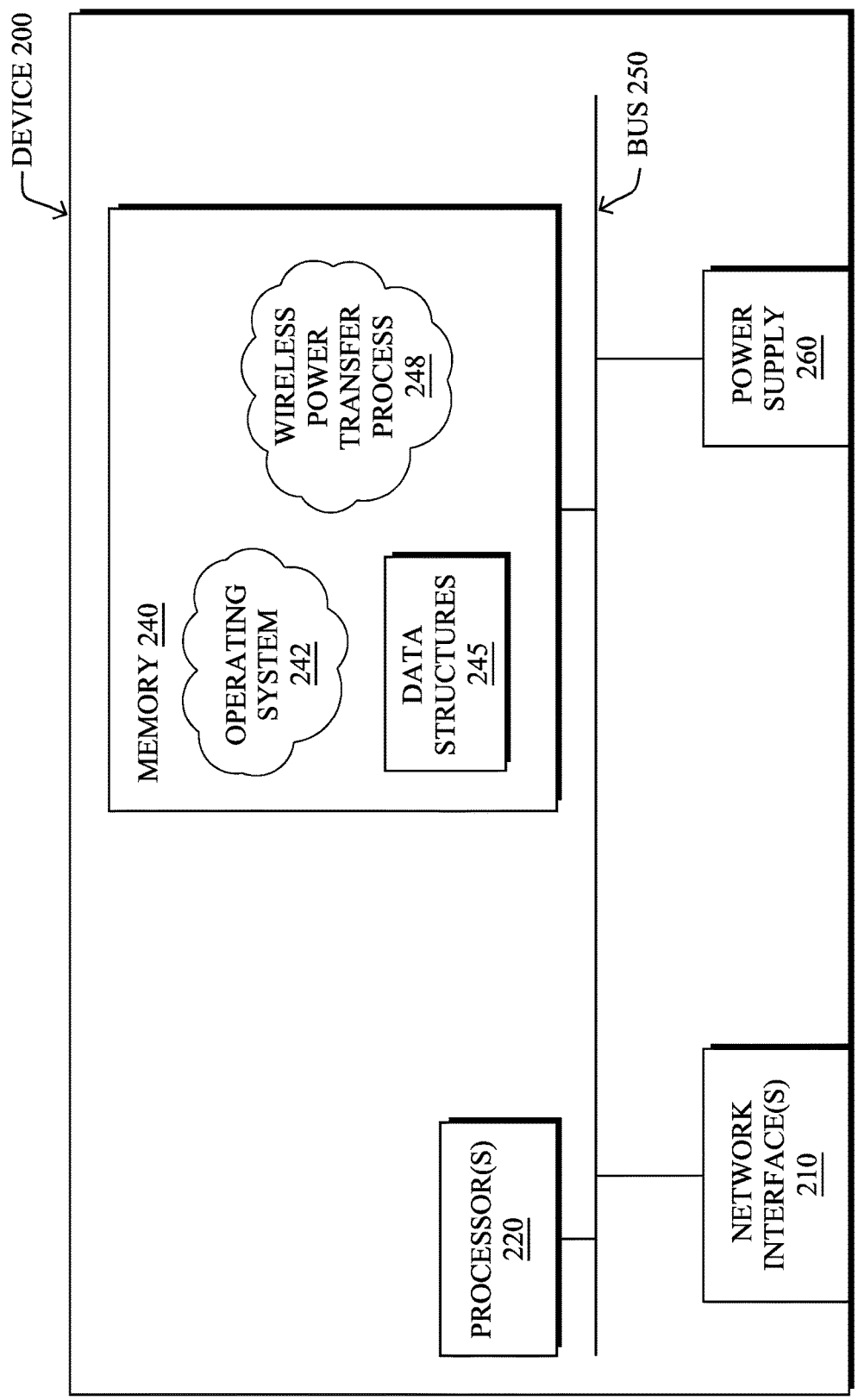
FIG. 2 illustrates an example network device/node.

FIG. 2 is a schematic block diagram of an example computing device/node 200 that may be used with one or more embodiments described herein e.g., as any of the devices shown in FIG. 1 above or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, e.g., wireless and wired/physical connections, and that the view herein is merely for illustration. Also, while the network interface 210 is shown separately from power supply 260, for fog modules using PLC, the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise, among other processes, an illustrative WPT process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, WPT is an emerging technology that has proven to be effective for charging electric vehicles (EVs). In a typical WPT setup for EVs, a ground-based coil is supplied power, thereby inducing a current remotely in a second, vehicle-based coil located at the bottom of the EV.

In a dynamic WPT scenario, a moving EV can travel over the ground-based coils where energy is transferred to the cars as they pass over the coils. To improve energy efficiency and/or keep the level of electromagnetic radiation low, some implementations may (only) energize the ground-based coils when the EV is on top of the coils. Note that superconducting coils could also be used, thereby lowering the energy loss, but these types of coils are unlikely to be used in typical implementations. In addition, regulating when the coils are energized could prevent heating issues, which could otherwise damage the infrastructure and lead to reliability issues.

FIGS. 3A-3D illustrate an example of powering a ground-based charging coil for an upcoming vehicle, according to various embodiments. Notably, a similar arrangement can be used for static WPT systems, such as parking lots, driveways, garages, etc., and the illustrative environment is merely meant to demonstrate wireless charging in general, and the terms "road side unit (RSU)" is not meant to require an outdoor travelled road, but merely a computing device located near to a vehicular surface 166 such as a parking spot, road, etc. In fact, many of deployment scenarios for static WPT systems of the techniques herein are indoors, for example, in a multi-car parking garage or in the parking garage in the basement of an apartment building or a retail mall.

Continuing the example of FIG. 1B, assume in FIG. 3A that vehicle 160 is in communication with supervisory service 170 and/or RSU 150 that are part of a vehicle WPT system. During operation, vehicle 160 may send data regarding the vehicle characteristics to service 170 and/or RSU 150 for further processing. Example vehicle characteristics 302 may include, but are not limited to, any or all of the following:

A location of vehicle 160—for example, this information can include a Global Positioning System (GPS) coordinate from vehicle 160, navigation information from a subsystem of vehicle 160 (e.g., a vehicle navigation system), a signal that can be used to triangulate the location of vehicle 160, or any of multiple indoor location based techniques including wireless or LIDAR (light detection and ranging) or SLAM (simultaneous location and mapping) via cameras, etc.

A velocity of vehicle 160—this information can be used to determine whether vehicle 160 is stationary or in motion, as well as timing information, to determine when the charging coils of vehicle 160 are expected to be in close proximity to a particular one of the ground-based charging coils 164. If this information is not provided, it can be derived based on changes in the location of vehicle 160 over time. (Notably, for static WPT, this information need not be necessary for charging, though may still be useful for vehicular control, as described below.)

Acceleration information for vehicle 160—in some cases, vehicle 160 may also provide acceleration information as part of vehicle characteristics 302, such as from its accelerometer. If this information is not provided, it can be derived based on changes in the velocity of vehicle 160 over time. (Note again, that for static WPT, this information need not be necessary for charging, though may still be useful for vehicular control, as described below.)

Make, model, and/or options of vehicle 160—this information can be used to determine the specific charging capabilities of vehicle 160 from the factory. For example, a certain manufacturer may offer upgraded charging systems on certain models over others (e.g., a larger capacity battery, a larger charging coil, etc.).

Coil information for vehicle 160—this information may include data regarding the physical dimensions of vehicle-based charging coil 162 and/or the location of coil 162 on vehicle 160. For example, this information may indicate the size and/or shape of coil 162 (e.g., length and width measurements, if coil 162 is rectangular, a radius measurement, if coil 162 is circular, etc.). In another example, the coil information regarding coil 162 may indicate the distance between coil 162 and one or more sides of vehicle 160 (e.g., coil 162 may be ⅔ of the way from the front of vehicle 160, x-number of feet or inches from the passenger or driver's side of vehicle 160, etc.). This information can be used to indicate whether coil 162 is perfectly centered on vehicle 160 or, if not, its offsets from the center. In a further example, the information regarding coil 162 can also indicate the height or planarity of coil 162 relative to the ground (e.g., a height of M1 inches when vehicle 160 is not moving, a height of M2 inches when vehicle 160 is traveling at slow speeds, a height of M3 inches when vehicle 160 is traveling at highway speeds, etc.). In various embodiments, the coil information for vehicle 160 can also be retrieved (e.g., by service 170), based on the make, model, and/or options of vehicle 160.

Age of vehicle 160—As noted above, battery life and charging capabilities of a vehicle can change over time. This information can be used to predict how much of a change is expected from that of the factory configuration. For example, this information may comprise the year in which vehicle 160 was made.

Battery specifications of vehicle 160—if the battery cannot be identified, such as when the make/model of vehicle 160 is not available, vehicle 160 can nonetheless provide the specifications of its battery as part of vehicle characteristics 302, in some cases.

Maintenance history of vehicle 160—For example, if the battery of vehicle 160 was replaced at some point in time, this information can be pertinent to determining the appropriate charging parameters for vehicle 160.

Battery management system (BMS) data from vehicle 160—this data can include any information regarding the current and/or prior states of the battery of vehicle 160. For example, the BMS data may be indicative of the existing charge in the battery of vehicle 160, a history of charging of the battery of vehicle 160, the current battery temperature and/or surrounding temperature, or the like.

Authentication information from vehicle 160—in the case where WPT charging is restricted, provided on a controlled basis (e.g., only to residents, only on a paid basis, etc.), or the like, this information can also be included in vehicle characteristics 302.

Surrounding information regarding vehicle 160—further information regarding the surroundings of vehicle 160 may include, for example, information regarding other vehicles within proximity of vehicle 160. Such information may be obtained, for example, by cameras, LIDAR, radar, or other sensors that may be located on vehicle 160 or along vehicle surface 166.

As would be appreciated, any or all of the above vehicle characteristics 302 may be determined by vehicle 160 or, alternatively, by RSU 150 (e.g., based on sensor data from sensors of RSU 150, etc.).

In FIG. 3B, supervisory service 170 may use the received vehicle characteristics 302, to determine the appropriate coil charging parameters 306 for ground-based charging coils 164. Generally, coil charging parameters 306 may indicate which of ground-based charging coils 164 are to be powered, if any, when coils 164 should be powered, and the appropriate power level to be supplied. For example, based on the vehicle characteristics 302, supervisory service 170 may determine that the charging coil 162 of vehicle 160 will be in close proximity (e.g., less than several feet for dynamic WPT systems, or directly above for static WPT systems) with that of ground-based charging coil 164*b* at a time $t=t_1$. In addition, supervisory service 170 may determine that vehicle 160 requires charging, is authorized to charge, and/or an amount of power that should be delivered to the identified ground-based charging coil 164*b*. Note that in further embodiments, any or all of these determinations may be made at the fog layer, such as by RSU 150.

In case of dynamic WPT, supervisory service 170 may also communicate charging information 304 back to vehicle 160 regarding the charging process. For example, charging information 304 may include driving parameters while vehicle 160 is in motion (e.g., directing vehicle 160 to maintain a certain speed, stay in the current lane, etc.), confirmations or notifications regarding the charging, or the like.

In some embodiments, charging information 304 may include alignment information that can be used by vehicle 160 to ensure that vehicle-based charging coil 162 is properly aligned with ground-based charging coil 164, when vehicle 160 passes over coil 164. For example, charging information 304 may indicate to vehicle 160 the lane in which coil 164 is situated and potentially the proper position for vehicle 160 within that lane. In addition, service 170 may also determine the optimal lane position for vehicle 160 and include this in charging information 304, so as to maximize the transfer of power during charging by ground-based charging coil 164 (e.g., such that the overlap of coils 162 and 164 is maximized).

In situations when ground-based charging coil 164 is in the center of the lane/parking spot and vehicle-based charging coil 162 is located at the center of vehicle 160 (e.g., in terms of side-to-side dimensions), then coil alignment is relatively easy and vehicle 160 simply needs to drive down the center of the lane. However, in many cases, ground-based charging coil 164 may be offset from the center of the lane/parking spot (e.g., six inches to the right of lane center, etc.) or vehicle-based charging coil 162 may not be located centrally on vehicle 160 (e.g., four inches left of vehicle center, etc.). In such cases, including alignment information in charging information 304 allows vehicle 160 to be directed towards the proper alignment, for maximum charging. For example, charging information 304 may indicate that vehicle 160 should move ten inches to the right of lane center, to maximize the overlap, if coil 164 is six inches to the right of the center of the lane and coil 162 is four inches to the left of the center of vehicle 160. This relatively small change of ten inches may lead to a significant increase in the percentage of overlap between coils 162 and 164 and, therefore, the power transfer. Implementation of the recommended alignment can be achieved either autonomously, if vehicle 160 is so capable (e.g., as described below), or via feedback to the driver.

Figure 3C:
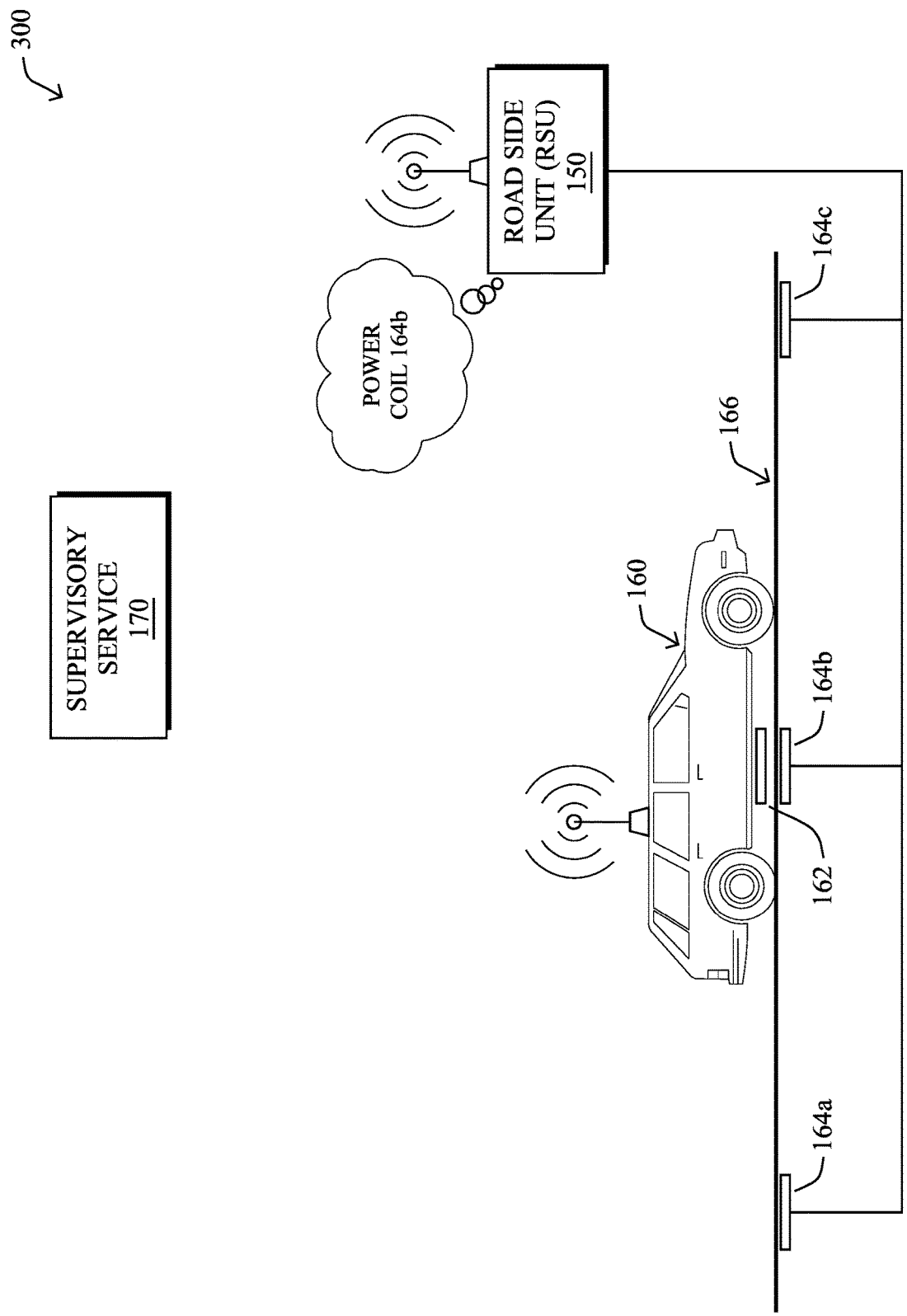

In FIG. 3C, RSU 150 may provide power to ground-based charging coil 164*b*, based on coil charging parameters 306. For example, RSU 150 may cause ground-based charging coil 164*b* to be powered to a certain power level, in advance of vehicle 160 arriving at ground-based charging coil 164*b* for dynamic WPT systems, or else once the vehicle is located within the corresponding charging spot for static WPT systems. Thus, when vehicle-based charging coil 162 is within charging proximity of ground-based charging coil 164b, the two coils may inductively couple with one another, thereby transferring power to vehicle 160 that can be used to charge the battery of vehicle 160.

Figure 3D:
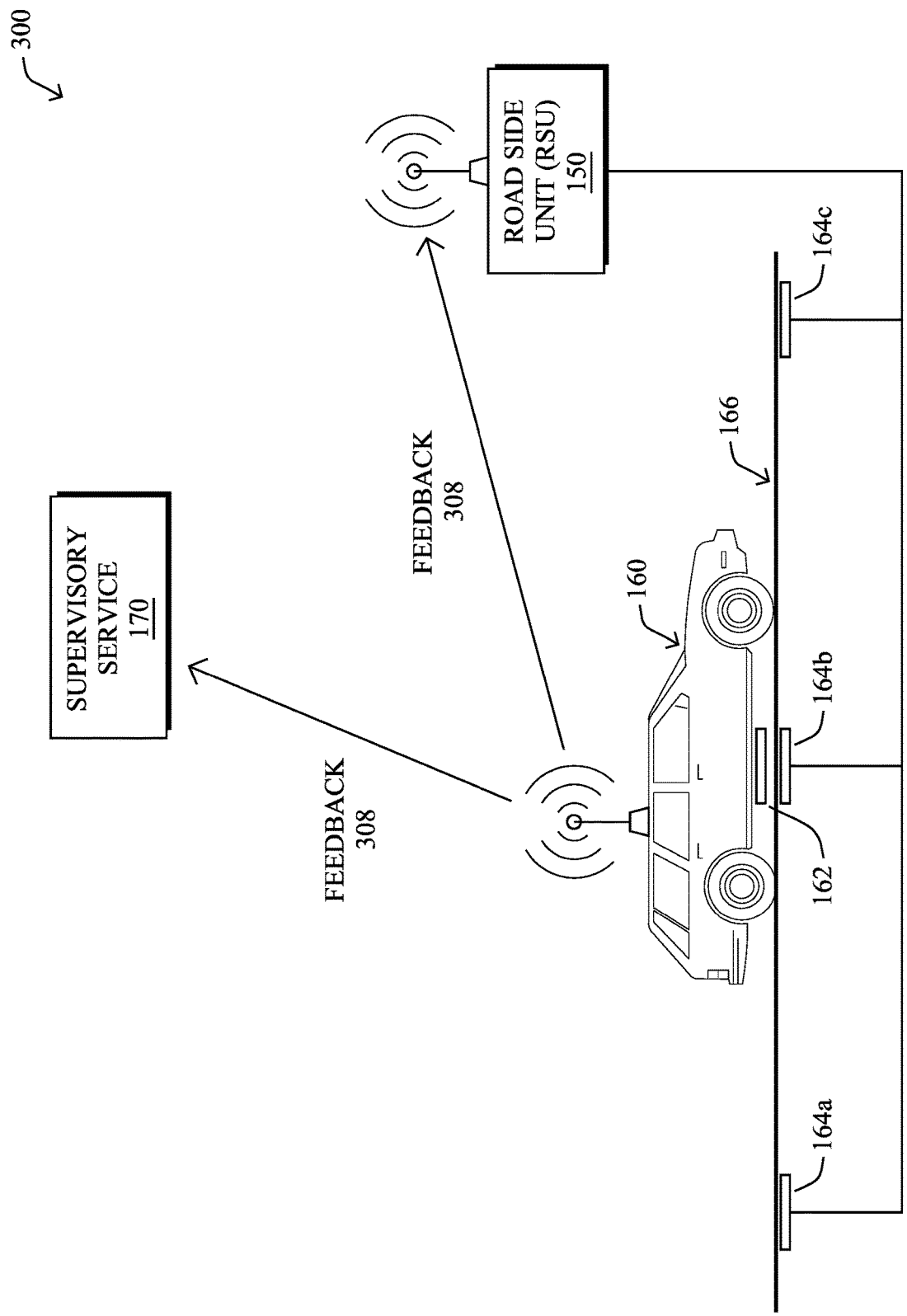

In FIG. 3D, vehicle 160 may also provide feedback 308 to supervisory service 170, and/or to RSU 150, regarding the charging from ground-based charging coil 164b, during the charge or after the charge is complete. For example, feedback 308 may be indicative of the amount of charge that vehicle 160 was able to obtain from ground-based charging coil 164b, timing information in terms of the power transfer, or any other information regarding the charging operation. Such feedback can be used, in some embodiments, to update a machine learning model that seeks to optimize the power transfer process.

Figure 4:
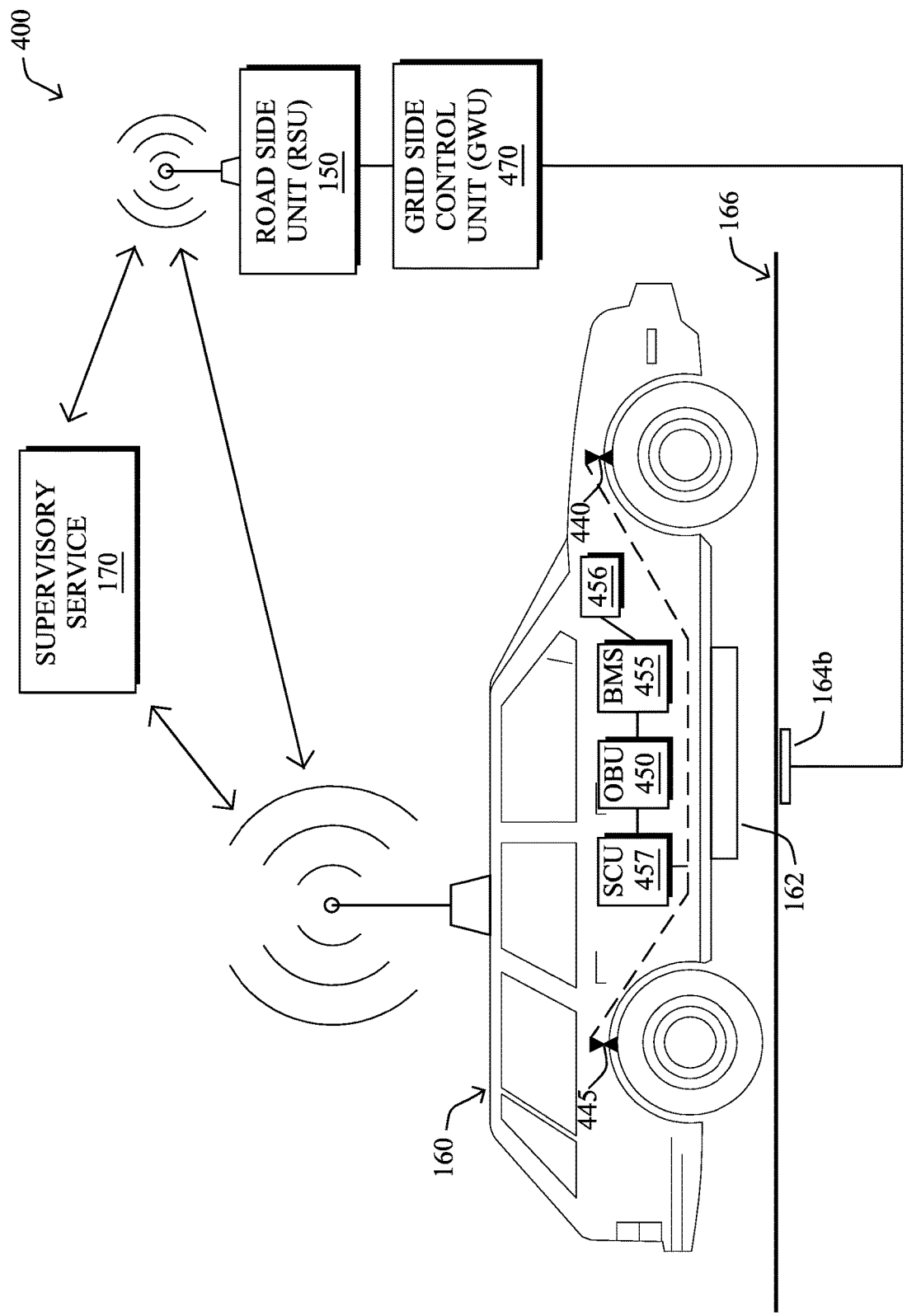
FIG. 4 illustrates another example of supplying the power to a ground-based charging coil.

Additionally, FIG. 4 illustrates an alternative view 400 of a WPT charging system, according to various embodiments. As described above, vehicle 160 may be in communication with RSU 150 and/or supervisory service 170, so that ground-based charging coil 164b is powered as necessary (e.g., in advance of vehicle-based charging coil 162 coming within charging proximity of coil 164b for dynamic WPT, or else once the vehicle is parked within a charging spot for static WPT). More specifically, based on the movement and/or location of vehicle 160, RSU 150 may send an indication of the appropriate charging information to a grid side control unit (GCU) 470 that powers ground-based charging coil 164b, accordingly. Note that GCU 470 may be integrated into RSU 150, in some implementations.

As shown, vehicle 160 may include a number of subsystems, to facilitate the transfer of power. For example, vehicle 160 may further comprise an On Board Unit (OBU) 450 that communicates with the other local systems of vehicle 160 and communicates with RSU 150 and/or supervisory service 170. In addition, vehicle 160 may include a Battery Management System (BMS) 455 that oversees the local battery 456 of vehicle 160 and regulates the charging thereof.

In various embodiments, OBU 450 may further be in communication with a local Suspension Control Unit (SCU) 457 of vehicle 160 that that provides control and adjustment of the vehicle suspension through adjustable suspension components 440 and 445 (e.g., adjustable shocks, struts, etc.). In other words, SCU 457 and adjustable suspension components 440-455 may operate as an adjustment system that adjusts the height of vehicle 160 and the plane of vehicle-based charging coil 162 relative to vehicle surface 166. (Other systems may be used to adjust the height and/or location of the coils, both 162 and 164b, and suspension adjustment is merely one example of an orientation change that could be controlled in order to adjust WPT charging parameters, accordingly.)

—Automated Vehicle Parking and WPT Charging—

As noted above, electric vehicles (EVs), such as cars, buses, trains, and the like, are becoming increasingly more prevalent. As such, to aid in recharging EVs, many parking garages and lots are now equipped with charging stations. Currently, the charging procedure for EVs in parking garages and lots is cumbersome to the EV user. In particular, an EV user needs to find an unoccupied parking spot that is equipped with a charging station. Even if the user finds such a spot, he or she is then required to plug in a charging cable to charge the vehicle (which, notably, can be a trip hazard and may require regular maintenance due to fraying/damage), and once the car has finished charging, the user needs to be diligent enough to return to the parking spot, disconnect and store the cable properly, drive the car out of that spot, find another empty spot to park his or her car, and then go about their day. This is particularly burdensome as the EV user may not be in the vicinity of the vehicle or may be busy when the EV completes charging, leading to a lack of available charging spots in the garage or lot. Furthermore, when charging is monetized, this can also translate into a loss of revenue due to underutilized infrastructure and lack of customer satisfaction. Moreover, it is currently cost prohibitive to supply all parking spots with WPT coils (in terms of both monetary costs and power supply costs).

The techniques herein, therefore, allow for the charging of EVs in a parking lot or garage in an intelligent and automated manner. In some aspects, the system leverages wireless power transfer (WPT) and autonomous driving, to move vehicles to and from charging locations. In further aspects, the system may use sensor fusion and fog/cloud computing to garner information about the vehicles and their surroundings, as well as to provide autonomous control over the vehicles.

Specifically, according to one or more embodiments of the disclosure as described in detail below, a static WPT system receives a request to charge a vehicle, where the static WPT system has one or more charging spots and one or more non-charging parking spots. A period of time is then scheduled during which the vehicle is allocated access to a particular charging spot of the one or more charging spots based on one or more scheduling characteristics and one or more other vehicles requesting charging within the static WPT system. Based on determining a current parking spot of the one or more parking spots in which the vehicle is parked prior to the scheduled period of time, instructions may be sent to control the vehicle to autonomously move from the current parking spot to the particular charging spot for the scheduled period of time, the instructions precisely aligning the vehicle in the particular charging spot for optimum power transfer based on the vehicle-based charging coil of the vehicle and the respective ground-based charging coil of the particular charging spot. Subsequently, the device may send further instructions to control the vehicle to autonomously move out of the particular charging spot after the scheduled period of time (e.g., into a staging spot, to the original parking spot, to a valet pickup spot, etc.). Further aspects of the embodiments herein, such as partial charging and returning at a later time at a lower priority, and so on, are also described in greater detail below.

Illustratively, the techniques described herein may be performed by hardware, software, and/or firmware, such as in accordance with the WPT process 248, which may include computer executable instructions executed by the processor 220 (on a single device or with functionality divided among a plurality of devices) to perform functions relating to the techniques described herein, e.g., in conjunction with associated devices and applications on respective devices (e.g., vehicle control applications, user notification applications, etc.).

Figure 5:
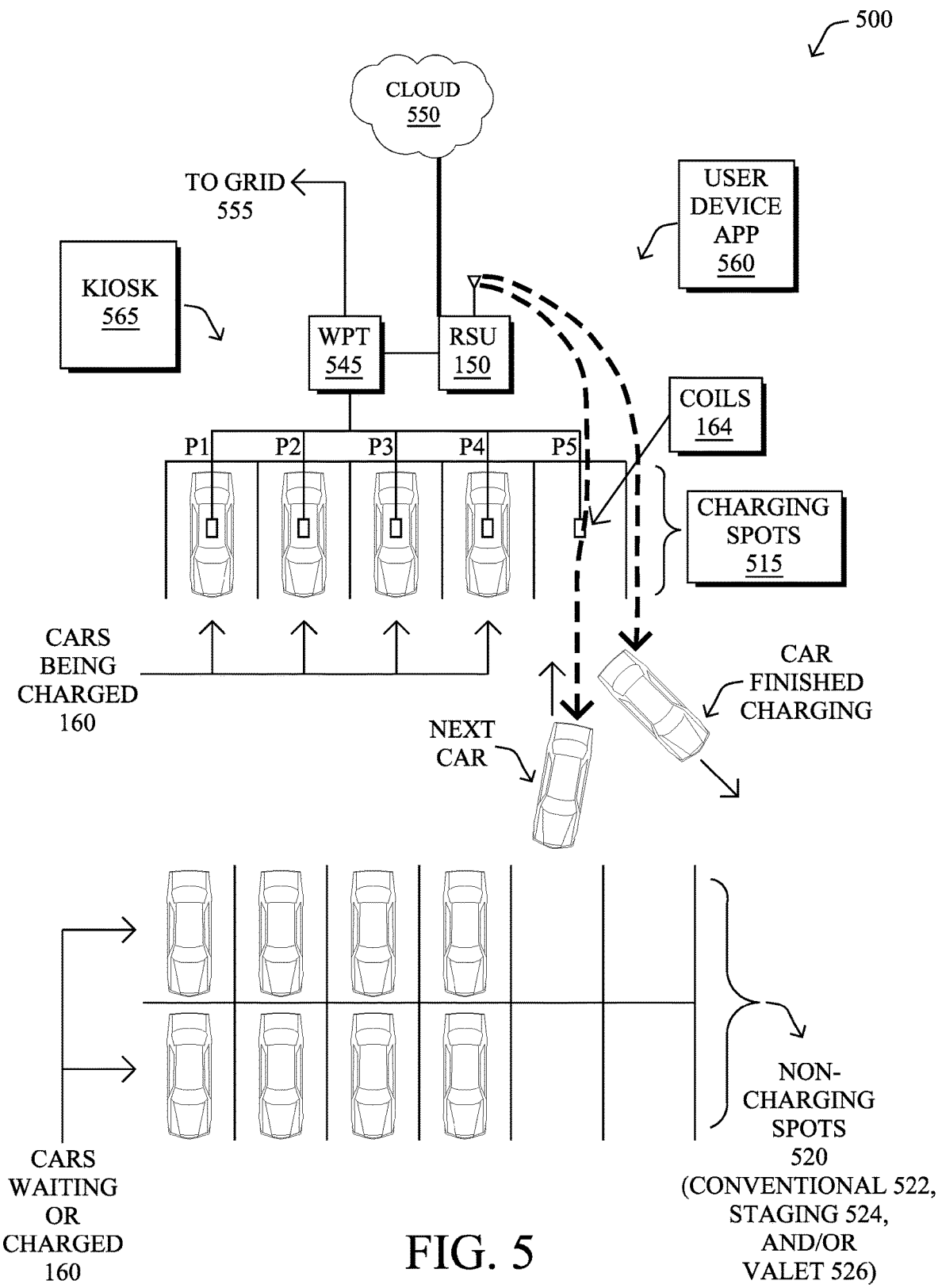
FIG. 5 illustrates an example static wireless power transfer (WPT) system.

Operationally, the solution herein leverages two emerging vehicle technologies: wireless power transfer (WPT) and autonomous driving. An illustrative static WPT system 500 is shown in FIG. 5 (e.g., a parking lot, parking garage, or other static parking structure or configuration, including controlled street parking, elevated space parking, and so on), which may be a single ground-level area, or may be similarly situated on a plurality of floors within a multi-floor parking structure. As shown, the system 500 may comprise a parking facility 510 with stationary WPT charging locations "P1-P5" (spaces or "spots") 515 and non-charging spaces/spots 520, into which autonomous vehicles 160 enabled for WPT may park. In one embodiment, one or more of the non-charging spots 520 are conventional parking spaces 522 into which a driver may enter and exit the vehicle, or else may be more closely spaced spots 524 in a pre- or post-charging "staging area", as described below. Other "valet" spots 526 may also be available for use as described herein.

A communication infrastructure comprising a road-side unit (RSU) 150 may be present to communicate with vehicles 160 and with the computer network (e.g., cloud) 550 and electric utility/grid 555. Additionally, in certain embodiments where users are present, a user application 560, such as on a user's smartphone or vehicle dashboard may be used for user interaction as described herein. Alternatively, a nearby parking kiosk 565 can also be used for such user interaction. WPT controller 545 (e.g., GWU 470) further communicates with the RSU and the electric grid 555 to supply power to the charging coils 164 of the charging spots 515.

According to one or more aspects of the embodiments herein, the above elements may collectively be configured to gather any or all of the following information, making use of techniques such as sensor fusion and/or fog or cloud computing:

1) Data from the charging station (WPT/RSU):
whether vehicle is currently charging;
whether charging is complete;
power transfer rate;
space assignments and queue states;
and so on.
2) Data from app (mobile device, vehicle, and/or kiosk):
make;
model;
registration;
battery capacity;
financial payment information;
location;
vehicle sensor information (e.g., Lidar, cameras, GPS, etc.);
when the owner expects to pick up his/her vehicle;
how much charge the owner wants (e.g., in KW/hrs or miles or in max money spent, such as, for example, the owner wants to add 20 KW/hrs or 60 miles to ensure he/she has enough energy to get home, or to add $10 worth of energy, etc.);
and so on.
3) Data regarding current lot state from other sources:
location of other vehicles;
data from other vehicles;
data from other sensors (e.g., cameras, etc.);
and so on.
4) Information (present & future) from energy providers:
cost of energy;
availability of energy;
and so on.

According to one or more embodiments of the present disclosure, an example of the operation of the system herein may proceed as follows, with respect to embodiments involving user-based interaction (since the techniques herein may also be applicable to fully automated vehicle charging systems, as well, such as EV fleets, drones, etc.). First, when the vehicle enters the garage or lot, an app on the user's phone, car dashboard, or parking kiosk can offer the user an option of charging the EV. Alternatively, an appointment can also be made in advance to schedule a charging time. As mentioned above, the app interacts with the local vehicle-to-internet (V2I) communication infrastructure (RSU+ WPT) via local communication (e.g., Bluetooth, Wi-Fi to a local and shared access point, near field communication, etc.) or through-the-cloud communication channels (e.g., cellular, Wi-Fi to a cloud app prior to reaching the local RSU+WPT, etc.).

The system, which may include communication with power utility companies, may offer various charging options such as, for example:

1. Different priorities and/or rates based on the amount of time available for user's anticipated return to fetch the car. This can help the system schedule different users at different times, servicing those users who may be in more of a hurry than those who may be parking there for a longer periods of time. (Note that increased costs may be associated with the return timing priority as well, i.e., a user may be required to pay more for faster service if they expect to be scheduled ahead of other users or even to re-schedule other users who may not be leaving the parking structure until later.)
2. Different rates depending on the time of the day (e.g., the utility company providing the service may incentivize charging during certain hours when they may be anticipating less load or excess energy generation from natural resources).
3. Priority in charging and amount of such charging required. For example, one may select high priority for 50 miles worth of charge at a higher rate, and/or lower priority (when openings exist) for topping off to full charge at a lower rate. Such a rate structure can help the system schedule more users in a given time and attract more users to the facility due to better overall pricing. It also allows for more users to receive a sufficient charge, while allowing for certain users to have their cars return for further charging if time permits.

Once the user makes a selection and authorizes the transaction, the system will add the user's vehicle 160 to its request queue, and can ask the user to leave the EV and take over the "valet" operation. Note that the user may be originally parked in a conventional parking spot 522, or else a valet spot 526.

The system can now communicate with the vehicle's autonomous driving system and direct it to a particular parking spot. Depending on the scheduling approach used by the system, it may be a parking spot with WPT charging station (charging spot 515) or an ordinary (e.g., non-charging station) spot 522 or specific staging spot 524 used for pre- and post-charging. Note that these pre- and post-staging spots can be tightly spaced as there won't be a driver who needs to get in and out of the vehicle, and/or also constituted as long narrow lanes like queues that further optimize available space. This means higher utilization of parking real estate. (Similarly, the charging spots 515 can also be very closely spaced, since it is not necessary to have room for a person to open the door and walk in/out of the car.)

Notably, the autonomous parking features herein can also be leveraged to obtain parking optimized for maximum power efficiency. Specifically, for WPT the power efficiency depends on how well aligned are the two coils (primary coil in the ground/parking spot and secondary coil on the vehicle). In a normal (non-charging) case of autonomous parking, an ideal alignment might be for example, determined by equal margins around the periphery of vehicle. However, such a parking may not result in the most efficient alignment of the two coils resulting in less than optimal power transfer. What's more, each parking spot may have slightly different coil placement due to many factors including installation tolerances. This coupled with different cars (make, model, versions, etc.) means that quite often the "optimal" parking in terms of maximizing distance from neighboring parking spaces may be highly sub-optimal in terms of efficient alignment for wireless power transfer. According to the techniques herein, therefore, autonomous parking control attempts to optimize power transfer (as opposed to physically aesthetic parking), where the parking infrastructure at every parking-charging spot can interact with the autonomous vehicle to fine tune the parking such that the coils are aligned for maximum power transfer efficiency.

Figure 6:
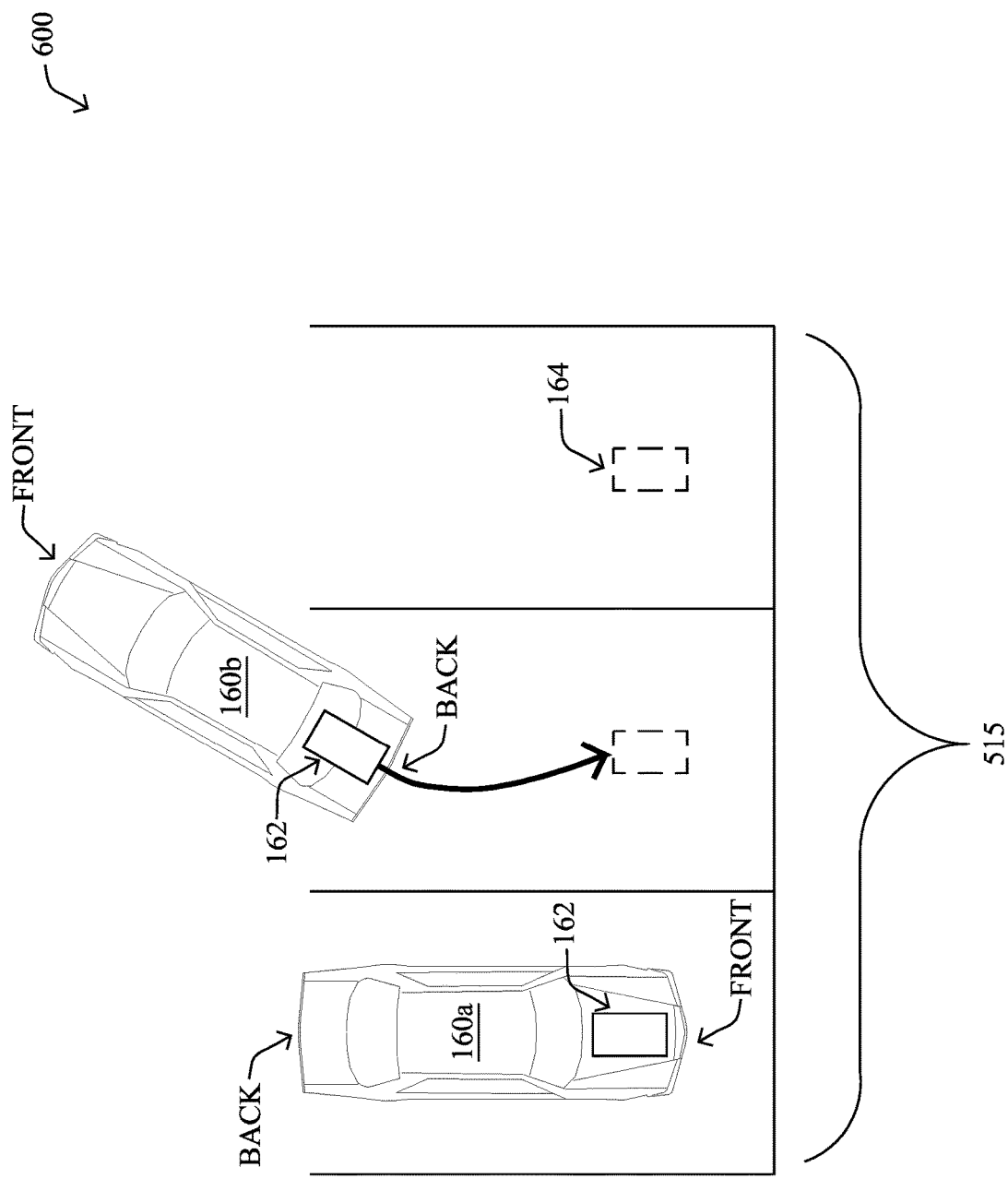
FIG. 6 illustrates an example of precise charging alignment in WPT systems.

In particular, with reference to FIG. 6, a closer view 600 of a charging spot 515 and vehicle 160, the autonomous driving control herein has added benefit that the system can use its ability to park a vehicle in a manner that is precisely aligned for the optimum power transfer. For example, as shown in FIG. 6, and as mentioned above, the location of the charging coil may be different between different types of vehicles, and may be different between different charging spot configurations. As such, the ability to coordinate the known locations of each respective coil and to precisely park the vehicle in a position that optimizes power transfer is critical. As shown, therefore, a vehicle 160a with a charging coil 162 located nearer to its front may need to be driven directly into the spot 515 with a coil 164 located further from the entrance to the spot, while another vehicle 160b with a charging coil 162 located nearer to its rear may need to be backed into the same charging spot configuration. (Any suitable configurations and orientations are possible between the vehicle 160 and charging coil 164, including left/right and even gap distance control as mentioned above, and the examples shown herein are merely a simplified example for illustration.)

Referring again to FIG. 5, when a vehicle has reached the determined power level (e.g., full, partial, etc.), based on either the precise charge level of the vehicle, or more particularly based on the scheduled time allocated to the particular vehicle, the WPT system can stop charging the vehicle and inform the system, which in turn can direct the vehicle to pull out and park itself in a predetermined spot. The spot to which the vehicle returns may be the same spot from which it was retrieved, another staging area spot, a valet spot, and so on. The system can now fetch next vehicle in its queue and repeat the process.

Figure 7:
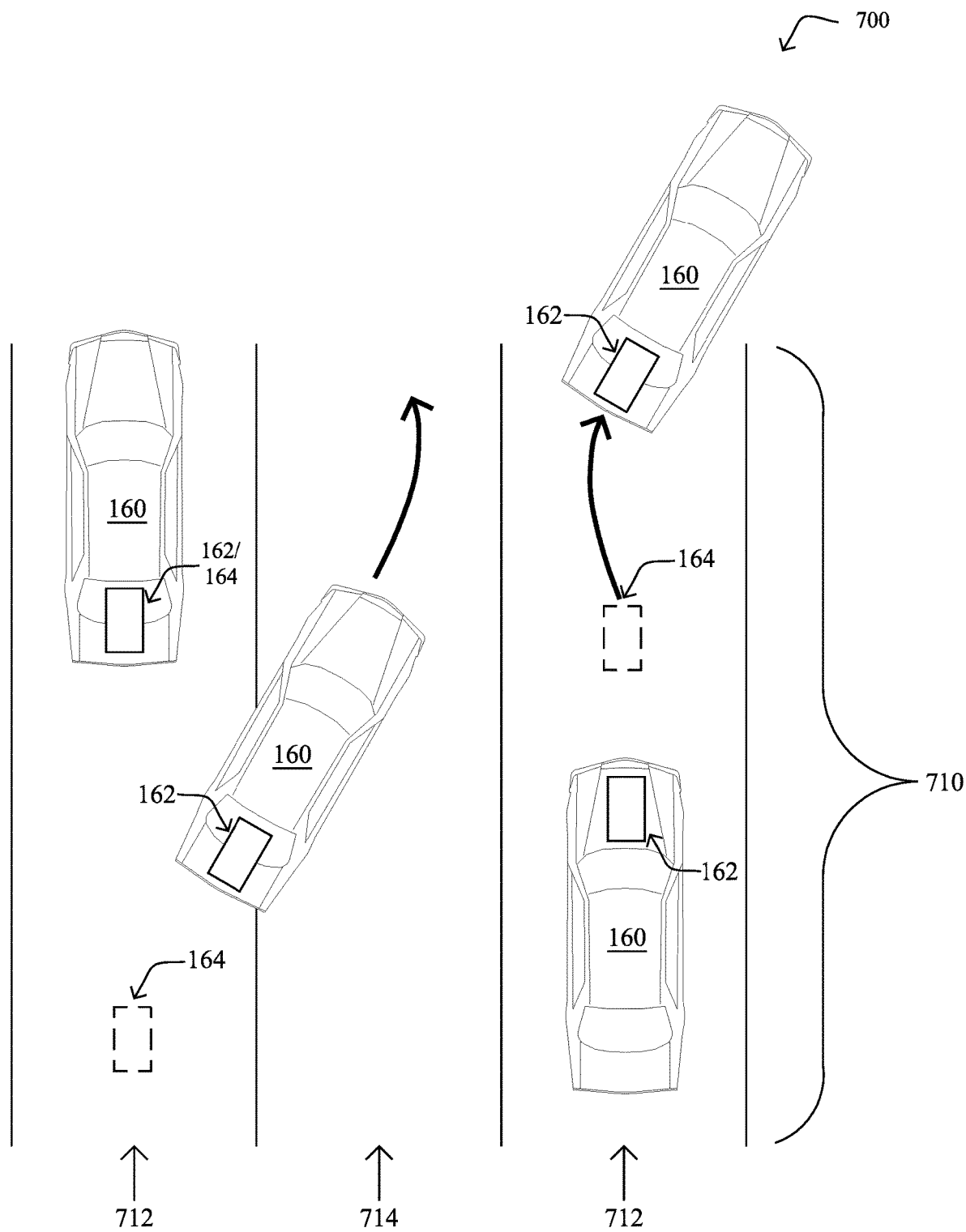
FIG. 7 illustrates an example of serial charging in WPT systems.

According to an alternative parking arrangement, lanes or queues of charging vehicles may be established such that the vehicles move serially on top of a coil or coils. For instance, with reference generally to FIG. 7, such a serial charging WPT system 700 eliminates traditional individual parking and instead creates long lanes of autonomous vehicles 160 in multiple queues 710 (of any length of a plurality of vehicles, two shown merely for simplicity). The vehicles enter the linear queues and leave from the end as they finish charging, with one or more charging coils 164 located throughout the lanes. Multiple lanes/queues may be formed based on rate of charging and priorities such that vehicles with similar charging profiles are put in same queue. These queues may also offer different quality of service (QoS), such as based on customer membership, available charging resource, vehicle energy level and charging capabilities, customer's willingness to pay, length of expected visit, etc. For example, though certain embodiments may comprise as few as one lanes for a queue, as shown a three or more lane arrangement may be used, with charging lanes 712 and free lanes 714, which can facilitate moving and parking, such as for when the customer signals when they are coming for the pickup (e.g., coming earlier than expected, or when they dropped off the vehicle they didn't know how long it would take) and then the automated solution could arrange the vehicles differently or to remove the vehicle from line in order to drive away when the customer arrives.

Figure 8:
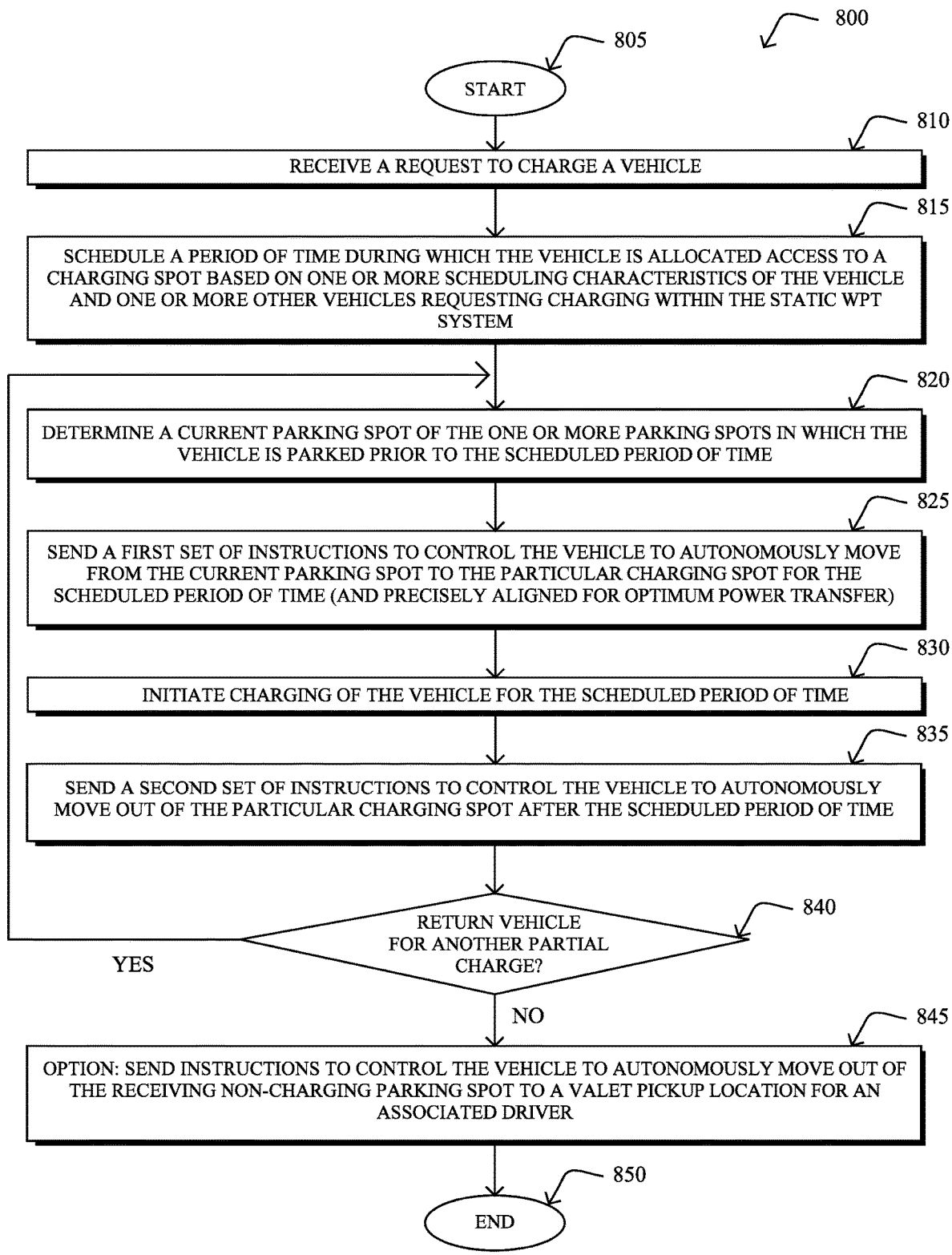
FIG. 8 illustrates an example simplified procedure for automated vehicle parking and wireless power transfer (WPT) charging.

FIG. 8 illustrates an example simplified procedure for automated vehicle parking and WPT charging in accordance with one or more embodiments described herein. For example, a non-generic, specifically configured device (e.g., device 200) may perform procedure 800 by executing stored instructions (e.g., process 248). The procedure 800 may start at step 805, and continues to step 810, where, as described in greater detail above, the device 200 (e.g., RSU 150, supervisory service 170, or other controlling device associated with a static WPT system) receives a request to charge a vehicle 160 equipped with a vehicle-based charging coil 162 configured to receive electrical power transferred from ground-based charging coils 164, wherein the static WPT system has one or more charging spots 515 with a respective ground-based charging coil and one or more non-charging parking spots 520 (e.g., 522, 524, and/or 526). As mentioned above, the request may be communicated over a communication channel (e.g., a local communication channel and/or a remote network communication channel), such as V2I channels, cellular channels, local wireless or wired (e.g., from a kiosk) channels, and so on. Also, the request may be received prior to the vehicle arriving at the static WPT system location, or else once the vehicle has arrived.

In step 815, the device may schedule a period of time during which the vehicle is allocated access to a particular charging spot of the one or more charging spots based on one or more scheduling characteristics and one or more other vehicles requesting charging within the static WPT system. For example, as detailed above, illustrative scheduling characteristics may comprise comparative priority levels associated with the vehicle and the one or more other vehicles, requested "vehicle ready times" associated with the vehicle and the one or more other vehicles (e.g., when a user is expected to return to the vehicle or when the user simply wants to be sure his or her vehicle has completed charging), or any number of other factors, such as user-defined policies associated with the vehicle and the one or more other vehicles (e.g., where the policies correspond to acceptance of price changes based on energy availability to the static WPT system, price premiums for busy times, etc.). As such, the scheduled period of time may then be based on one or more charging characteristics, such as vehicle make, vehicle model, vehicle age, battery type, battery age, battery charge level, maintenance history, power charging rate, power cost, and so on.

Note that in one embodiment, the techniques herein may be configured to re-schedule previously scheduled vehicles based on subsequently received requests of other vehicles. Additionally, in another embodiment, machine learning may be used to detect and predict patterns of users and vehicles, such as by monitoring scheduled periods of time and scheduling characteristics over time, and training a machine learning model to analyze the data (i.e., the monitored scheduled periods and scheduling characteristics over time), such that the scheduled periods of time can be determined at least in part based on the analysis. For example, machine learning can be used to determine the average time to charge a particular model of car, or may learn user patterns (e.g., returning to their cars at 4 PM every day), and so on.

In step 820, the device determines a current parking spot (of the one or more parking spots 520) in which the vehicle is parked prior to the scheduled period of time, and can then a first set of instructions to control the vehicle to autonomously move from the current parking spot to the particular charging spot 515 for the scheduled period of time in step 825. Note that in one aspect of the embodiments herein, the first set of instructions may be configured to precisely align the vehicle in the particular charging spot for optimum power transfer based on the vehicle-based charging coil of the vehicle and the respective ground-based charging coil of the particular charging spot. Also notably, depending upon the implementation of the techniques herein, the instructions may be a single transmission of location, a single transmission of step-by-step instructions to get from the starting point to the desired end point, or may be a continuous stream of instructions to autonomously drive the vehicle into the desired location.

After the initiating charging of the vehicle for the scheduled period of time in step 830, then in step 835 the device may then a second set of instructions to control the vehicle to autonomously move out of the particular charging spot. As described above, the receiving non-charging parking spot can be a conventional spot 522, or else may be a staging spot 524, which may be configured next to one or more other non-charging parking spots in a manner that provides insufficient space for a driver to access a driver door of the vehicle.

Optionally, in step 840, where partial charging is performed, the vehicle may be later returned for a second (or more) partial charges, continuing back to step 820 above to determine the location of the vehicle and send instructions for the vehicle to return to its subsequent stage of charging. Said differently, when the vehicle is associated with a first priority level for initially charging during a first period of time, and a second priority level for further charging during a second period of time, the device may provide a partial charge to the vehicle, and then may send a "third" set of instructions to control the vehicle to autonomously move to a given charging spot for a second scheduled period of time, and then send a "fourth" set of instructions to control the vehicle to autonomously move out of the given charging spot after the second scheduled period of time.

As an additionally optional step, particularly where the second set of instructions controls the vehicle to autonomously move the vehicle to a receiving non-charging parking spot, in step 845 the device may further send instructions to control the vehicle to autonomously move out of the receiving non-charging parking spot to a valet pickup location 526 for an associated driver.

The simplified procedure 800 may end in step 850, notably with the ability to continue scheduling other vehicles into and out of the charging spots as described above. Also, throughout the charging and autonomous vehicle relocation services, the device may also be informing a user device corresponding to the vehicle of either a current charge status of the vehicle or a current location of the vehicle, as well as any other pertinent information (e.g., pictures/video of the vehicle being moved and/or charged, etc.).

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for automated vehicle parking and WPT charging in an efficient and effective manner. In particular, EV users need not find unoccupied charging parking spots, or manually plug in the vehicle or be diligent enough to move their vehicle after charging is complete, in order to allow other users to charge their vehicles. As such, the techniques herein assist in the proliferation of electric vehicles, helping to overcome some of the initially perceived burdens of manual charging. Furthermore, the techniques herein provide advanced control processes for optimum scheduling (e.g., serial charging of different vehicles, or in certain cases, the same vehicle at later times/rates), and optimum charging alignment within the spaces thanks to the autonomous control features herein. As an even further benefit, parking lot space sizes can be more efficiently designed, allowing for greater numbers of cars, or conversely less allocated real estate, for parking in general. Furthermore, the automated charging equipment and automated scheduling results in less damages to operating equipment due to mishandling, less errors, and less operational costs associated with human labor.

While there have been shown and described illustrative embodiments that provide for automated vehicle parking and WPT charging, it is to be understood that various other adaptations and modifications may be made within the spirit and scope of the embodiments herein. For example, while the techniques herein are described particularly with respect to automobiles, the techniques herein can be applied to any known form of vehicle, such as autonomous vehicles, aerial vehicles, drones, and the like.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
  receiving, at a device associated with a static wireless power transfer (WPT) system, a request to charge a vehicle equipped with a vehicle-based charging coil configured to receive electrical power transferred from ground-based charging coils, wherein the static WPT system has one or more charging lanes, each of which with a one or more ground-based charging coils, and one or more non-charging parking spots;
  scheduling, by the device, a time at which the vehicle is allocated access to a particular charging lane of the one or more charging lanes based on one or more scheduling characteristics and one or more other vehicles requesting charging within the static WPT system;
  determining, by the device, a current parking spot of the one or more non-charging parking spots in which the vehicle is parked prior to the scheduled time;
  sending, by the device, a first set of instructions to control the vehicle to drive autonomously from the current parking spot into the particular charging lane at the scheduled time, the first set of instructions causing the vehicle to drive autonomously along one or more ground-based charging coils disposed in the particular charging lane in a serial fashion with one or more other vehicles being driven autonomously by the device, and the first set of instructions precisely aligning the vehicle-based charging coil of the vehicle with a particular ground-based charging coil in the particular charging lane for optimum power transfer; and sending, by the device, a second set of instructions to control the vehicle to drive autonomously out of the particular charging lane after a charging operation of the vehicle is finished.

2. The method as in claim 1, wherein the one or more scheduling characteristics comprise comparative priority levels associated with the vehicle and the one or more other vehicles.

3. The method as in claim 2, wherein the vehicle is associated with a first priority level for initially charging during a first period of time, and a second priority level for further charging during a second period of time.

4. The method as in claim 1, wherein the one or more scheduling characteristics comprise requested vehicle ready times associated with the vehicle and the one or more other vehicles.

5. The method as in claim 1, wherein the one or more scheduling characteristics comprise user-defined policies associated with the vehicle and the one or more other vehicles, the policies corresponding to acceptance of price changes based on energy availability to the static WPT system.

6. The method as in claim 1, wherein the scheduled period of time provides a partial charge to the vehicle.

7. The method as in claim 6, further comprising:
sending a third set of instructions to control the vehicle to autonomously move to a given charging spot for a second scheduled period of time; and
sending a fourth set of instructions to control the vehicle to autonomously move out of the given charging spot after the second scheduled period of time.

8. The method as in claim 1, wherein the scheduled time is based on one or more charging characteristics selected from a group consisting of: vehicle make; vehicle model; vehicle age; battery type; battery age; battery charge level; maintenance history; power charging rate; and power cost.

9. The method as in claim 1, wherein the second set of instructions control the vehicle to autonomously move to a receiving non-charging parking spot, the method further comprising:
sending a third set of instructions to control the vehicle to autonomously move out of the receiving non-charging parking spot to a valet pickup location for an associated driver.

10. The method as in claim 9, wherein the receiving non-charging parking spot is configured next to one or more other non-charging parking spots in a manner that provides insufficient space for a driver to access a driver door of the vehicle.

11. The method as in claim 1, further comprising:
adding the vehicle to a charging queue with the one or more other vehicles.

12. The method as in claim 1, further comprising:
receiving the request prior to the vehicle arriving at the static WPT system location.

13. The method as in claim 1, further comprising:
re-scheduling previously scheduled vehicles based on subsequently received requests of other vehicles.

14. The method as in claim 1, further comprising:
informing a user device corresponding to the vehicle of either a current charge status of the vehicle or a current location of the vehicle.

15. The method as in claim 1, wherein a communication channel over which the first and second sets of instructions are sent comprises one of either a local communication channel or a remote network communication channel.

16. The method as in claim 1, further comprising:
monitoring scheduled periods of time and scheduling characteristics over time; and
training a machine learning model to analyze the monitored scheduled periods and scheduling characteristics over time, wherein the scheduled periods of time are determined at least in part based on the analysis.

17. An apparatus comprising:
one or more network interfaces to communicate with a static wireless power transfer (WPT) system;
a processor coupled to the network interfaces and configured to execute one or more process; and
a memory configured to store a process executable by the processor, the process when executed configured to:
receive a request to charge a vehicle equipped with a vehicle-based charging coil configured to receive electrical power transferred from ground-based charging coils, wherein the static WPT system has one or more charging lanes, each of which with one or more ground-based charging coils, and one or more non-charging parking spots;
schedule a time at which the vehicle is allocated access to a particular charging lane of the one or more charging lanes based on one or more scheduling characteristics and one or more other vehicles requesting charging within the static WPT system;
determine a current parking spot of the one or more non-charging parking spots in which the vehicle is parked prior to the scheduled time;
send a first set of instructions to control the vehicle to drive autonomously from the current parking spot into the particular charging lane at the scheduled time, the first set of instructions causing the vehicle to drive autonomously along one or more ground-based charging coils disposed in the particular charging lane in a serial fashion with one or more other vehicles being driven autonomously by the device, and the first set of instructions precisely aligning the vehicle-based charging coil of the vehicle with a particular ground-based charging coil in the particular charging lane for optimum power transfer; and
send a second set of instructions to control the vehicle to drive autonomously out of the particular charging lane after a charging operation of the vehicle is finished.

18. The apparatus as in claim 17, wherein the one or more scheduling characteristics comprise comparative priority levels associated with the vehicle and the one or more other vehicles.

19. The apparatus as in claim 17, wherein the one or more scheduling characteristics comprise requested vehicle ready times associated with the vehicle and the one or more other vehicles.

20. A tangible, non-transitory, computer-readable medium storing program instructions that cause a device in a static wireless power transfer (WPT) system to perform a process comprising:
receiving a request to charge a vehicle equipped with a vehicle-based charging coil configured to receive electrical power transferred from ground-based charging coils, wherein the static WPT system has one or more charging lanes, each of which with a respective ground-based charging coils, and one or more non-charging parking spots;

scheduling a time at which the vehicle is allocated access to a particular charging lane of the one or more charging lanes based on one or more scheduling characteristics and one or more other vehicles requesting charging within the static WPT system;

determining a current parking spot of the one or more non-charging parking spots in which the vehicle is parked prior to the scheduled time;

sending a first set of instructions to control the vehicle to drive autonomously from the current parking spot into the particular charging lane at the scheduled time, the first set of instructions causing the vehicle to drive autonomously along one or more ground-based charging coils disposed in the particular charging lane in a serial fashion with one or more other vehicles being driven autonomously by the device, and the first set of instructions precisely aligning the vehicle-based charging coil of the vehicle with a particular ground-based charging coil in the particular charging lane for optimum power transfer; and sending a second set of instructions to control the vehicle to drive autonomously out of the particular charging lane after a charging operation of the vehicle is finished.

* * * * *